(12) United States Patent
Marcinelli et al.

(10) Patent No.: US 11,544,798 B1
(45) Date of Patent: Jan. 3, 2023

(54) INTERACTIVE ANIMATED USER INTERFACE OF A STEP-WISE VISUAL PATH OF CIRCLES ACROSS A LINE FOR INVOICE MANAGEMENT

(71) Applicant: Bottomline Technologies, Inc., Portsmouth, NH (US)

(72) Inventors: Michael Marcinelli, North Andover, MA (US); Alisha Edwards, Amesbury, MA (US)

(73) Assignee: Bottomline Technologies, Inc.

( * ) Notice: Subject to any disclaimer, the term of this patent is extended or adjusted under 35 U.S.C. 154(b) by 0 days.

(21) Appl. No.: 17/459,108

(22) Filed: Aug. 27, 2021

(51) Int. Cl.
*G06Q 40/00* (2012.01)
*G06F 16/26* (2019.01)
*G06Q 30/04* (2012.01)

(52) U.S. Cl.
CPC ............. *G06Q 40/12* (2013.12); *G06F 16/26* (2019.01); *G06Q 30/04* (2013.01)

(58) Field of Classification Search
None
See application file for complete search history.

(56) References Cited

U.S. PATENT DOCUMENTS

| | | |
|---|---|---|
| 4,575,793 A | 3/1986 | Morel et al. |
| 5,228,122 A | 7/1993 | Cahn et al. |
| 5,559,961 A | 9/1996 | Blonder |
| 5,600,735 A | 2/1997 | Seybold |
| 5,600,835 A | 2/1997 | Garland et al. |
| 5,634,008 A | 5/1997 | Gaffaney et al. |

(Continued)

FOREIGN PATENT DOCUMENTS

| | | |
|---|---|---|
| EP | 1211865 A2 | 6/2002 |
| EP | 1706960 A1 | 10/2006 |

(Continued)

OTHER PUBLICATIONS

Appaloosa Store, "String Similarity Algorithms Compared", Apr. 5, 2018, webpage downloaded on Oct. 20, 2020 from https://medium.com/@appaloosastore/string-similarity-algorithms-compared-3f7b4d12f0ff.

(Continued)

*Primary Examiner* — Fateh M Obaid
(74) *Attorney, Agent, or Firm* — Niki Camateros-Mann; Richard A. Baker, Jr.

(57) ABSTRACT

A unique animated graphical user interface for improving the tracking of documents is described herein. The user interface comprises of symbols that move across a line to represent the status of that document. The line may be separated into quadrants. To facilitate this graphical user interface, a non-transitory machine-readable media is programmed to store invoices in a list in a database and count the number of invoices in each quadrant in the list in the database. The first quadrant may include a representation of the number of new documents that are not yet uploaded. The second quadrant may include a representation of the number of uploaded documents that may not be able to process without further analysis. The third quadrant may include a representation of the number of uploaded documents that have been automatically processed by the software and are ready to submit electronically. The fourth quadrant may include a representation of the number of documents submitted electronically.

17 Claims, 5 Drawing Sheets

(56) References Cited

U.S. PATENT DOCUMENTS

| | | |
|---|---|---|
| 5,644,717 A | 7/1997 | Clark |
| 5,790,798 A | 8/1998 | Beckett et al. |
| 5,845,369 A | 12/1998 | Dunchock |
| 5,912,669 A | 6/1999 | Hsia |
| 5,961,592 A | 10/1999 | Hsia |
| 5,970,482 A | 10/1999 | Pham et al. |
| 6,044,401 A | 3/2000 | Harvey |
| 6,192,411 B1 | 2/2001 | Chan et al. |
| 6,205,416 B1 | 3/2001 | Butts et al. |
| 6,256,737 B1 | 7/2001 | Bianco et al. |
| 6,523,016 B1 | 2/2003 | Michalski |
| 6,651,099 B1 | 11/2003 | Dietz et al. |
| 6,675,164 B2 | 1/2004 | Kamath et al. |
| 6,687,693 B2 | 2/2004 | Cereghini et al. |
| 6,708,163 B1 | 3/2004 | Kargupta et al. |
| 6,801,190 B1 | 10/2004 | Robinson et al. |
| 6,845,369 B1 | 1/2005 | Rodenburg |
| 7,092,941 B1 | 8/2006 | Campos |
| 7,174,462 B2 | 2/2007 | Pering et al. |
| 7,308,436 B2 | 12/2007 | Bala et al. |
| 7,415,509 B1 | 8/2008 | Kaltenmark et al. |
| 7,716,129 B1 | 5/2010 | Tan et al. |
| 7,730,521 B1 | 6/2010 | Thesayi et al. |
| 7,822,598 B2 | 10/2010 | Carus et al. |
| 7,831,703 B2 | 11/2010 | Krelbaum et al. |
| 7,860,783 B2 | 12/2010 | Yang et al. |
| 7,992,202 B2 | 8/2011 | Won et al. |
| 8,229,875 B2 | 7/2012 | Roychowdhury |
| 8,229,876 B2 | 7/2012 | Roychowdhury |
| 8,392,975 B1 | 3/2013 | Raghunath |
| 8,401,867 B2 | 3/2013 | Lagadec et al. |
| 8,429,745 B1 | 4/2013 | Casaburi et al. |
| 8,433,791 B2 | 4/2013 | Krelbaum et al. |
| 8,515,862 B2 | 8/2013 | Zhang et al. |
| 8,638,939 B1 | 1/2014 | Casey et al. |
| 8,650,624 B2 | 2/2014 | Griffin et al. |
| D704,209 S | 5/2014 | Russell et al. |
| 8,776,213 B2 | 7/2014 | McLaughlin et al. |
| 8,844,059 B1 | 9/2014 | Manmohan |
| 8,881,005 B2 | 11/2014 | Al et al. |
| 9,015,036 B2 | 4/2015 | Karov et al. |
| D757,054 S | 5/2016 | Starbuck et al. |
| D764,495 S | 8/2016 | Cartlidge |
| D766,952 S | 9/2016 | Gedrich et al. |
| 9,449,346 B1 | 9/2016 | Hockey et al. |
| 9,489,627 B2 | 11/2016 | Bala |
| D774,052 S | 12/2016 | Gedrich et al. |
| 9,529,678 B2 | 12/2016 | Krelbaum et al. |
| D776,131 S | 1/2017 | Cartlidge |
| 9,537,848 B2 | 1/2017 | McLaughlin et al. |
| 9,595,023 B1 | 3/2017 | Hockey et al. |
| 9,607,103 B2 | 3/2017 | Anderson |
| D785,016 S | 4/2017 | Berwick et al. |
| 9,667,609 B2 | 5/2017 | McLaughlin et al. |
| 9,691,085 B2 | 6/2017 | Scheidelman |
| D792,441 S | 7/2017 | Gedrich et al. |
| 9,798,984 B2 | 10/2017 | Paleja et al. |
| D803,233 S | 11/2017 | Wilberding |
| 10,037,533 B2 | 7/2018 | Caldera |
| 10,055,769 B1* | 8/2018 | Todd .................. G06Q 20/14 |
| 10,152,680 B1 | 12/2018 | Myrick et al. |
| 10,235,356 B2 | 3/2019 | Amend et al. |
| 10,242,258 B2 | 3/2019 | Guo et al. |
| 10,319,029 B1 | 6/2019 | Hockey et al. |
| 10,320,800 B2 | 6/2019 | Guo et al. |
| 10,395,287 B1* | 8/2019 | Lowell ............ G06Q 10/06316 |
| 10,402,817 B1 | 9/2019 | Benkreira et al. |
| 10,414,197 B2 | 9/2019 | Jesurum |
| 10,440,015 B1 | 10/2019 | Pham et al. |
| 10,467,631 B2 | 11/2019 | Dhurandhar et al. |
| 10,510,083 B1 | 12/2019 | Vukich et al. |
| 10,511,605 B2 | 12/2019 | Ramberg et al. |
| 10,523,681 B1 | 12/2019 | Bulgakov et al. |
| D872,737 S | 1/2020 | Ressel et al. |
| 10,552,837 B2 | 2/2020 | Jia et al. |
| 10,552,841 B1 | 2/2020 | Dixit |
| 10,607,008 B2 | 3/2020 | Byrne et al. |
| 10,607,228 B1 | 3/2020 | Gai et al. |
| 10,621,587 B2 | 4/2020 | Binns et al. |
| 10,699,075 B2 | 6/2020 | Amend et al. |
| 10,824,809 B2 | 11/2020 | Kutsch et al. |
| 10,909,511 B2 | 2/2021 | Chanyontpatanakul |
| 10,929,851 B2 | 2/2021 | Kang et al. |
| 11,042,555 B1 | 6/2021 | Kane et al. |
| 2001/0047332 A1* | 11/2001 | Gonen-Friedman ... G06Q 30/04 705/40 |
| 2002/0019945 A1 | 2/2002 | Houston et al. |
| 2002/0056043 A1 | 5/2002 | Glass |
| 2002/0065938 A1 | 5/2002 | Jungck et al. |
| 2002/0080123 A1 | 6/2002 | Kennedy et al. |
| 2002/0099649 A1 | 7/2002 | Lee et al. |
| 2002/0163934 A1 | 11/2002 | Moore et al. |
| 2003/0041042 A1 | 2/2003 | Cohen et al. |
| 2003/0083764 A1 | 5/2003 | Hong |
| 2003/0110394 A1 | 6/2003 | Sharp et al. |
| 2003/0135612 A1 | 7/2003 | Huntington et al. |
| 2003/0204421 A1* | 10/2003 | Houle .................. G06Q 10/10 707/999.107 |
| 2003/0233305 A1 | 12/2003 | Solomon |
| 2004/0034666 A1 | 2/2004 | Chen |
| 2004/0186882 A1 | 9/2004 | Ting |
| 2004/0193512 A1* | 9/2004 | Gobin .................. G06F 16/972 705/29 |
| 2005/0021650 A1 | 1/2005 | Gusler et al. |
| 2005/0081158 A1 | 4/2005 | Hwang |
| 2005/0154692 A1 | 7/2005 | Jacobsen et al. |
| 2005/0177483 A1 | 8/2005 | Napier et al. |
| 2006/0101048 A1 | 5/2006 | Mazzagatti et al. |
| 2006/0155751 A1 | 7/2006 | Geshwind et al. |
| 2006/0190310 A1 | 8/2006 | Gudla et al. |
| 2006/0212270 A1 | 9/2006 | Shiu et al. |
| 2007/0277224 A1 | 11/2007 | Osborn et al. |
| 2007/0299751 A1* | 12/2007 | Jenkins ................ G06Q 40/123 705/31 |
| 2008/0104007 A1 | 5/2008 | Bala |
| 2009/0059793 A1 | 3/2009 | Greenberg |
| 2009/0094677 A1 | 4/2009 | Pietraszek et al. |
| 2009/0140838 A1 | 6/2009 | Newman et al. |
| 2009/0174667 A1 | 7/2009 | Kocienda et al. |
| 2009/0201257 A1 | 8/2009 | Saitoh et al. |
| 2009/0202153 A1 | 8/2009 | Cortopassi et al. |
| 2009/0307176 A1 | 12/2009 | Jeong et al. |
| 2009/0313693 A1 | 12/2009 | Rogers |
| 2010/0066540 A1 | 3/2010 | Theobald et al. |
| 2010/0130181 A1 | 5/2010 | Won |
| 2010/0169958 A1 | 7/2010 | Werner et al. |
| 2010/0185615 A1 | 7/2010 | Monga |
| 2010/0225443 A1 | 9/2010 | Bayram et al. |
| 2011/0055907 A1 | 3/2011 | Narasimhan et al. |
| 2011/0070864 A1 | 3/2011 | Karam et al. |
| 2011/0082911 A1 | 4/2011 | Agnoni et al. |
| 2011/0145587 A1 | 6/2011 | Park |
| 2011/0251951 A1 | 10/2011 | Kolkowitz et al. |
| 2011/0298753 A1 | 12/2011 | Chuang et al. |
| 2012/0041683 A1 | 2/2012 | Vaske et al. |
| 2012/0124662 A1 | 5/2012 | Baca et al. |
| 2012/0127102 A1 | 5/2012 | Uenohara et al. |
| 2012/0151553 A1 | 6/2012 | Burgess et al. |
| 2013/0071816 A1 | 3/2013 | Singh et al. |
| 2013/0117246 A1 | 5/2013 | Cabaniols et al. |
| 2013/0231974 A1 | 9/2013 | Harris et al. |
| 2013/0254115 A1 | 9/2013 | Pasa et al. |
| 2013/0339141 A1 | 12/2013 | Stibel et al. |
| 2014/0006347 A1 | 1/2014 | Qureshi et al. |
| 2014/0067656 A1 | 3/2014 | Cohen et al. |
| 2014/0149130 A1 | 5/2014 | Getchius |
| 2014/0282186 A1* | 9/2014 | Joyner .................. G06Q 10/20 715/771 |
| 2014/0366159 A1 | 12/2014 | Cohen |
| 2015/0039473 A1 | 2/2015 | Hu et al. |
| 2015/0220509 A1 | 8/2015 | Karov Zangvil et al. |
| 2015/0264573 A1 | 9/2015 | Giordano et al. |
| 2015/0339790 A1* | 11/2015 | Robinson ............ G06F 40/40 704/2 |

(56) References Cited

U.S. PATENT DOCUMENTS

| | | |
|---|---|---|
| 2015/0348041 A1 | 12/2015 | Campbell et al. |
| 2016/0041984 A1 | 2/2016 | Kaneda et al. |
| 2016/0352759 A1 | 12/2016 | Zhai |
| 2017/0039219 A1 | 2/2017 | Acharya et al. |
| 2017/0068954 A1 | 3/2017 | Hockey et al. |
| 2017/0070500 A1 | 3/2017 | Hockey et al. |
| 2017/0154382 A1 | 6/2017 | McLaughlin et al. |
| 2017/0163664 A1 | 6/2017 | Nagalla et al. |
| 2017/0177743 A1 | 6/2017 | Bhattacharjee et al. |
| 2017/0300911 A1 | 10/2017 | Alnajem |
| 2018/0107944 A1 | 4/2018 | Lin et al. |
| 2018/0349924 A1 | 12/2018 | Shah et al. |
| 2019/0014101 A1 | 1/2019 | Hockey et al. |
| 2019/0182233 A1 | 6/2019 | Hockey et al. |
| 2019/0197189 A1 | 6/2019 | Studnicka |
| 2019/0228411 A1 | 7/2019 | Hernandez-Ellsworth et al. |
| 2019/0318122 A1 | 10/2019 | Hockey et al. |
| 2019/0347281 A1 | 11/2019 | Natterer |
| 2019/0349371 A1 | 11/2019 | Smith et al. |
| 2019/0373001 A1 | 12/2019 | Deeb et al. |
| 2020/0013098 A1* | 1/2020 | Schnitt ............... G06Q 30/04 |
| 2020/0019964 A1 | 1/2020 | Miller et al. |
| 2020/0074886 A1* | 3/2020 | Robinson ............ H04N 21/485 |
| 2020/0117800 A1 | 4/2020 | Ramberg et al. |
| 2021/0049326 A1 | 2/2021 | Amend et al. |
| 2021/0110447 A1 | 4/2021 | Ransom et al. |
| 2022/0245359 A1* | 8/2022 | Ho ........................ G06K 9/6257 |
| 2022/0279244 A1* | 9/2022 | Bender ............ H04N 21/44218 |

FOREIGN PATENT DOCUMENTS

| | | |
|---|---|---|
| EP | 2653982 A1 | 10/2013 |
| EP | 2636149 A4 | 10/2016 |
| IL | 176551 A | 9/2012 |
| IN | 219405 | 3/2007 |
| KR | 10-0723738 B1 | 5/2007 |
| TW | 201723907 A | 7/2017 |
| WO | 01/25914 A2 | 4/2001 |
| WO | 02/87124 A1 | 10/2002 |
| WO | 2002/100039 A2 | 12/2002 |
| WO | 03/73724 A2 | 9/2003 |
| WO | 2005/067209 A1 | 7/2005 |
| WO | 2012/061701 A1 | 5/2012 |
| WO | 2014/145395 A2 | 9/2014 |
| WO | 2015/175824 A1 | 11/2015 |
| WO | 2017/096206 A1 | 6/2017 |
| WO | 2017/209799 A1 | 12/2017 |
| WO | 2018/022157 A1 | 2/2018 |

OTHER PUBLICATIONS

Banon, Shay, "Geo Location and Search", elastic blog post, Aug. 16, 2010, webpage found at https://www.elastic.co/blog/geo-location-and-search on Oct. 15, 2019.

Bansal, Nikhil, Avrim Blum, and Shuchi Chawla. "Correlation clustering." Machine Learning 56.1-3 (2004): 89-113.

Bottomline Technologies (de), Inc, "4 Steps to Bringing a Positive ROI to Accounts Payable", 2019, a white paper downloaded from https://go.bottomline.com/rs/498-XVR-738/images/4-Steps-Bringing-Positive-ROI-AP-IOFM-FDX-US-WTP-1802-088.pdf on Sep. 30, 2019.

Bottomline Technologies, Bottomline Cyber Fraud & Risk Management:Secure Payments, marketing brochure.

Brasetvik, Alex, "Elasticsearch from the Bottom up, Part 1", Elastic, Sep. 16, 2013. Webpage found at https://www.elastic.co/blog/found-elasticsearch-from-the-bottom-up on Jun. 17, 2019.

Co-pending U.S. Appl. No. 13/135,507, filed Jul. 7, 2011.

Dalit Amitai, Shahar Cohen, Yulia Mayer, and Avital Seraty, "Fraud Detection Rule Optimization", U.S. Appl. No. 16/985,773, filed Aug. 5, 2020.

EMV Payment Tokenisation Specification, Technical Framework, EMVCo, LLC, Version 2.1, Jun. 2019.

EMV Payment Tokenisation, A Guide to Use Cases, EMVCo, LLC, Version 1.0, Jun. 2019.

Ephesoft, "KV Extraction Normalization", webpage downloaded from https://ephesoft.com/docs/2019-1/moduleplugin-configuration/extraction-module/key-value-extraction-4040/key-value-extraction-plugin/kv-extraction-normalization/on Oct. 1, 2019.

Experian, "Fuzzy address searching", webpage downloaded from https://www.edq.com/glossary/fuzzy-address-searching/ on Oct. 8, 2019.

Fenz, Dustin, et al, "Efficient Similarity Search in Very Large String Sets", conference paper, Jun. 2012.

Finley, Thomas, and Thorsten Joachims. "Supervised clustering with support vector machines." Proceedings of the 22nd international conference on Machine learning, ACM, 2005.

G. Kou, Y. Peng, Y. Shi, M. Wise, W. Xu, Discovering credit cardholders behavior by multiple criteria linear programming, Annals of Operations Research 135, (2005) 261-274.

Haydn Shaughnessy, Solving the $190 billion Annual Fraud Problem: More on Jumio, Forbes, Mar. 24, 2011.

Holl, Xavier and Andrew Chisholm, "Extracting structured data from invoices", Proceedings of Australasian Language Technology Association Workshop, 2018, pp. 53-59.

IdentityMing, Accelerated Fintech Compliance and Powerful Online Fraud Prevention Tools, website found at https://identitymindglobal.com/momentum/ on Dec. 12, 2018.

International Search Report and Written Opinion received for PCT Patent Application No. PCT/IL05/000027, dated Jun. 2, 2005, 8 pages.

International Search Report and Written Opinion received for PCT Patent Application No. PCT/US17/13148, dated May 19, 2017, 11 pages.

Jeremy Olshan, How my bank tracked me to catch a thief, MarketWatch, Apr. 18, 2015.

Klaus et al., "Fast String Correction with Levenshtein-Automata", IJDAR (2002) 5: 67. https://doi.org/10.1007/S10032-002-0082-8.

Krawetz, N., "Looks Like It", 2011. Downloaded from from:http://www.hackerfactor.com/blog/index.php?/archives/432-Looks-Like-It.html on May 27, 2020.

Kwak et al., "Multiple Criteria Linear Programming Data Mining Approach: An Application for Bankruptcy Prediction", : Data Mining and Knowledge Management, Chinese Academy of Sciences Symposium, 2004, LNAI 3327, pp. 164-173, 2004.

Lada, Dr. Maria, "Combined Search and Examination Report", UK Intellectual Property Office, dated May 18, 2020.

Meia et al., Comparing clusterings—an information based distance, Journal of Multivariate Analysis 98 (2007) 873-895.

Mitchell, Stuart, et al, "pulp Documentation", Release 1.4.6, Jan. 27, 2010.

Oracle (Registered) Warehouse Builder Data Modeling, ETL, and Data Quality Guide, Chapter 23, 11g Release 2 (11.2), Part No. E10935-04, Aug. 2011, web page downloaded from https://docs.oracle.com/cd/E24693_01/owb.11203/e10935/match_merge.htm on Apr. 16, 2020.

Postel et al.; "Telnet Protocol Specification" RFC 854; entered into the case on Apr. 18, 2013.

RodOn, "location extraction with fuzzy matching capabilities", Blog post on StackOverflow.com, Jul. 8, 2014, webpage downloaded from https://stackoverflow.com/questions/24622693/location-extraction-with-fuzzy-matching-capabilities on Oct. 8, 2019.

Rosette Text Analytics, "An Overview of Fuzzy Name Matching Techniques", Blog, Dec. 12, 2017, webpage downloaded from https://www.rosette.com/blog/overview-fuzzy-name-matching-techniques/ on Oct. 15, 2019.

Samaneh Soroumejad, Zahra Zojaji, Reza Ebrahimi Atani, Amir Hassan Monadjemi, "A Survey of Credit Card Fraud Detection Techniques: Data and Technique Oriented Perspective", 2016.

Segers, Jens, "Perceptual image hashes", Dec. 13, 2014, webpage downloaded from https://jenssegers.com/perceptual-image-hashes on Sep. 27, 2019.

Sypht, "Unlock the value of your information", webpage downloaded from https://www.sypht.com/index.html on Sep. 27, 2019.

The Telnet Protocol Microsoft Knowledgebase; entered into the case on Apr. 18, 2013.

(56) References Cited

OTHER PUBLICATIONS

Vogler, Raffael, "Comparison of String Distance Algorithms", Aug. 21, 2013, webpage downloaded on Oct. 20, 2020 from https://www.joyofdala.de/blog/comparison-of-string-distance-algorithms.

Wikipedia, "Autoencoder", web page downloaded from http://en.wikipedia.org/wiki/Autoencoder on Dec. 18, 2020.

Wikipedia, "Damerau-Levenshtein distance", webpage downloaded on Oct. 20, 2020 from https://en.wikipedia.org/wiki/Damerau-Levenshtein_distance.

Wikipedia, "Reverse image search", Sep. 12, 2019. Downloaded from: https://en.wikipedia.org/w/index.php?title=Reverse_image_search&oldid=915372427 on May 27, 2020.

Written Opinion of the International Searching authority for corresponding International Application No. PCT/US2016/064689 dated Feb. 22, 2017.

"LT6Tu GIF", available online at <https://i.stack.imgur.com/LT6Tu.gif>, retrieved on Jul. 28, 2021, 1 page.

Craig Dehner, "Motion Design is the Future of UI", available online at <https://blog.prototypr.io/motion-design-is-the-future-of-ui-fc83ce55c02f>, Feb. 19, 2016, 7 pages.

\* cited by examiner

INTERACTIVE ANIMATED USER INTERFACE OF A STEP-WISE VISUAL PATH OF CIRCLES ACROSS A LINE FOR INVOICE MANAGEMENT

PRIOR APPLICATION

This is a priority patent application. This application draws upon information in the design patent application, US Design Patent Application No. 29/802,125, "Display Screen with an Animated User Interface of Circles Across a Line," filed on Aug. 3, 2021, which is incorporated by reference.

BACKGROUND

Technical Field

The non-transitory machine-readable media, methods, and apparatuses described herein generally relate to visual techniques for tracking documents through an animated graphical user interface on a display screen.

Description of the Related Art

There is a strong need in the document management industry to provide meaningful information to the supervising user in a way that is intuitive and easy to use. The current state of the art does not include a step-wise visualization for the status of documents.

In one example, the documents could be books in a library. When the books are returned to the library, they are scanned into the software, then the book needs to be looked up to see if it belongs in this library, or if it needs to be forwarded. Sometimes the software can find the book in the system, not that it is returned, and forward the book. Sometimes the book needs to be referred to a human operator to resolve an error in the check-in. There is no easy way for the head librarian to monitor the progress of a check-in process. There is a need to better visualize the progress of the book check-in.

In the field of legal spend management, for another example, auditors are hired to review every legal bill sent to an insurance company, a payment processing software, or other entity to assure that the billing adheres to contractual billing guidelines. This task of reviewing bills and invoices requires trained auditors, often lawyers themselves, to perform the tedious task of reading each line of each legal bill for compliance. The reviewers vary in their interpretation due to the personalities of each auditor. In addition, the labor costs of reviewing legal bills are high. For a supervisor, there is no current way to visualize the progress of the set of bills as they progress through the system.

While the example below uses legal invoices and accounts payable, the present inventions could be applied to medical bills, fleet maintenance bills, or any other types of documents that need to be tracked as they are processed.

The current state of the art does not allow for a step-wise visualization method for document tracking using machine learning. There is a strong need in the industry to improve the communications about the status of invoices from the machine to the supervising user, and to provide an easy, intuitive means for the supervising user to obtain the necessary information to manage invoices.

The present inventions address these issues.

BRIEF SUMMARY OF THE INVENTION

A non-transitory machine-readable media programmed to display the status of documents is described herein.

The non-transitory machine-readable media may be programmed to store a new invoice in a list in a database, count the number of new invoices in the list in the database, and display the number of new invoices that are not yet uploaded into an accounts payable package in a first quadrant of a line in one or more windows. The first quadrant may include is a new symbol on the line for each invoice that is not uploaded.

The non-transitory machine-readable media may process the invoice from the database in the accounts payable package on a computer with a display screen that contains the one or more windows, count the number of uploaded invoices needing further analysis in the database, and display the number of uploaded invoices that the accounts payable package cannot process without the further analysis in a second quadrant of the line in the one or more windows. The second quadrant may include an issue symbol on the line for each uploaded invoice with issues.

The non-transitory machine-readable media may count the number of uploaded invoices that do not need the further analysis in the database and display the number of uploaded invoices that do not need the further analysis in a third quadrant of the line in the one or more windows. The third quadrant may include a ready-to-submit symbol on the line for each uploaded invoice that is ready to submit.

The non-transitory machine-readable media may count the number of invoices submitted electronically to a payment processing software in the database and display the number of invoices submitted electronically to the payment processing software in a fourth quadrant of the line in the one or more windows. The fourth quadrant may include a submitted symbol on the line for each submitted invoice.

The non-transitory machine-readable media may display symbols that are a circle, triangle, or square and may be identical in shape to other symbols on the line. The issue symbol may be red or orange.

A computer-implemented method for visualizing invoice management through an animated graphical user interface from one or more processing units is described herein.

The computer-implemented method may comprise of storing an invoice in a database, counting the number of new invoices in the database, and displaying the number of new invoices that are not yet uploaded into an accounts payable package in a first quadrant of a line in one or more windows. The first quadrant may include a new symbol on the line for each invoice that is not uploaded.

The computer-implemented method may comprise of processing the invoice from the database in the accounts payable package on a computer with a display screen that contains the one or more windows, counting the number of uploaded invoices needing further analysis in the database, and displaying the number of uploaded invoices that the accounts payable package cannot process without the further analysis in a second quadrant of the line in the one or more windows. The second quadrant may include an issue symbol on the line for each uploaded invoice with issues.

The computer-implemented method may comprise of counting the number of uploaded invoices that do not need the further analysis in the database and displaying the number of uploaded invoices that do not need the further analysis in a third quadrant of the line in the one or more windows. The third quadrant may include a ready-to-submit symbol on the line for each uploaded invoice that is ready to submit.

The computer-implemented method may comprise of counting the number of invoices submitted electronically to a payment processing software in the database and displaying the number of invoices submitted electronically to the payment processing software in a fourth quadrant of the line in the one or more windows. The fourth quadrant may include a submitted symbol on the line for each submitted invoice.

The computer-implemented method may comprise of determining that an uploaded invoice cannot be submitted without the further analysis and moving the new symbol on the line that runs through the first quadrant into the second quadrant as the issue symbol in a red color.

The computer-implemented method may comprise of determining that an uploaded invoice cannot be submitted without the further analysis and moving the new symbol on the line that runs through the first quadrant into the second quadrant as the issue symbol in an orange color.

The computer-implemented method may comprise of uploading the invoice into the accounts payable package, determining that the invoice can be submitted electronically to the payment processing software without the further analysis, and moving the new symbol on the line that runs through the first quadrant into the third quadrant as the ready-to-submit symbol.

The computer-implemented method may comprise of submitting the invoice electronically to the payment processing software and moving the ready-to-submit symbol on the line that runs through the third quadrant into the fourth quadrant as the submitted symbol.

An apparatus for visualizing invoice management is described herein.

The apparatus may comprise of a display screen, a computer electrically connected to the display screen, and an interactive animated user interface on the display screen. The interactive animated user interface may operate on the computer and display a step-wise visual path of symbols across a line. The display of the step-wise visual path of the symbols may include one or more new symbols on the line that runs through a first quadrant for each invoice that is not uploaded. The display of the step-wise visual path of the symbols may include one or more issue symbols on the line that runs through a second quadrant for each uploaded invoice with issues. The display of the step-wise visual path of the symbols may include one or more ready-to-submit symbols on the line that runs through a third quadrant for each uploaded invoice that is ready to submit. The display of the step-wise visual path of the symbols may include one or more submitted symbols on the line that runs through a fourth quadrant for each submitted invoice.

The apparatus may comprise of an interactive animated user interface that determines if an uploaded invoice cannot be submitted without further analysis and that moves the new symbol on the line that runs through the first quadrant into the second quadrant as the issue symbol in a red color.

The apparatus may comprise of an interactive animated user interface that determines if an uploaded invoice can be submitted without further analysis and that moves the new symbol on the line that runs through the first quadrant into the second quadrant as the issue symbol in an orange color.

The apparatus may comprise of an interactive animated user interface that uploads the invoice into an accounts payable package, determines that the invoice can be submitted electronically to a payment processing software without further analysis, and moves the new symbol on the line that runs through the first quadrant into the third quadrant as the ready-to-submit symbol.

The apparatus may comprise of an interactive animated user interface that submits the invoice electronically to the payment processing software and moves the ready-to-submit symbol on the line that runs through the third quadrant into the fourth quadrant as the submitted symbol.

DETAILED DESCRIPTION

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Figure 1:
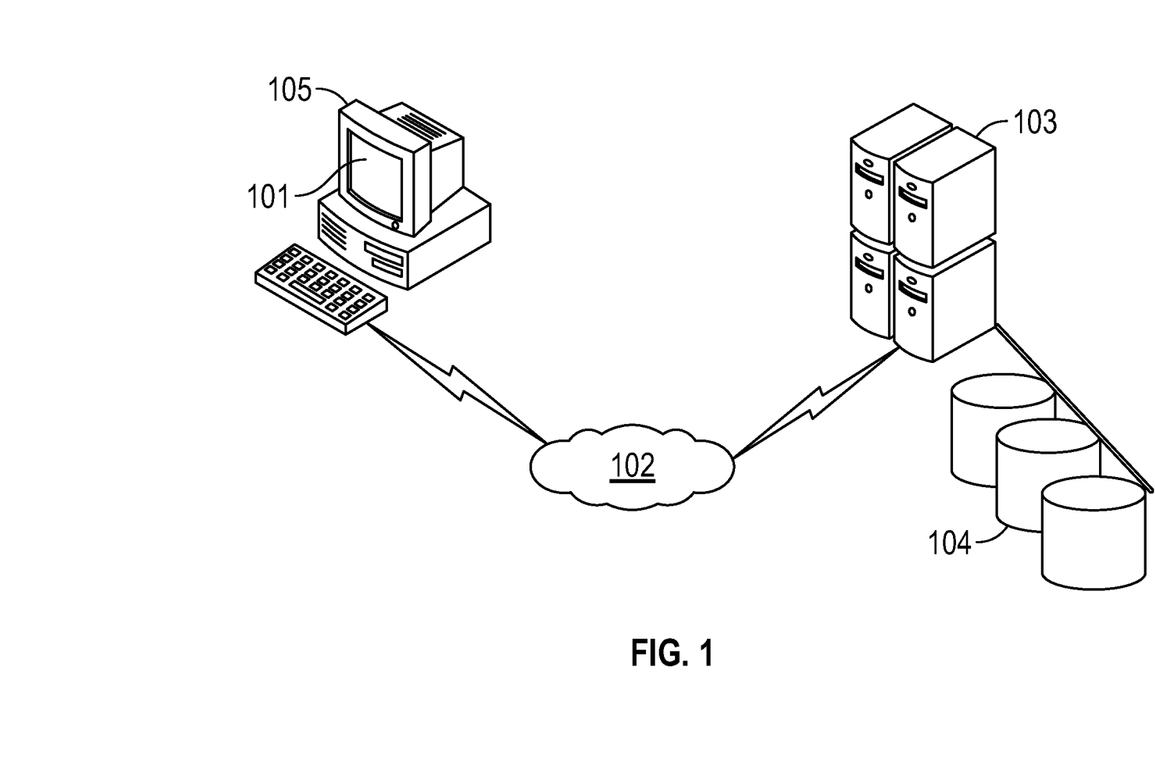
FIG. 1 is an electrical architecture of one embodiment.

Special purpose computing may be needed to build and execute the animated user interface described herein. FIG. 1 shows one such embodiment. The user views the user interface described here on a personal computing device such as a personal computer, laptop, tablet, smartphone, monitor, or similar device 101. The personal computing device 101 communicates through a network 102 such as the Internet, a local area network, wireless network, or perhaps through a direct interface to the server 103 and is displayed on a screen 105. The server 103 is a high-performance, multi-core computing device with significant storage facilities 104 to store the invoices, bills, and customer data. Since this document data is dynamic and continuously updated through the present inventions, this data must be kept online and accessible so that it can be updated.

The server 103 is a high-performance computing machine electrically connected to the network 102 and the storage facilities 104. The documents may be stored in a database on the storage facilities. In some embodiments, the software in this package could be running on the server 103 with the user interface operating on the device 101, perhaps through a web browser. In that embodiment, the software includes web server code to send the display information to the web browser. In another embodiment, the device 101 could run the package or the interface running on the server 103 on the display screen 105.

Figure 2:
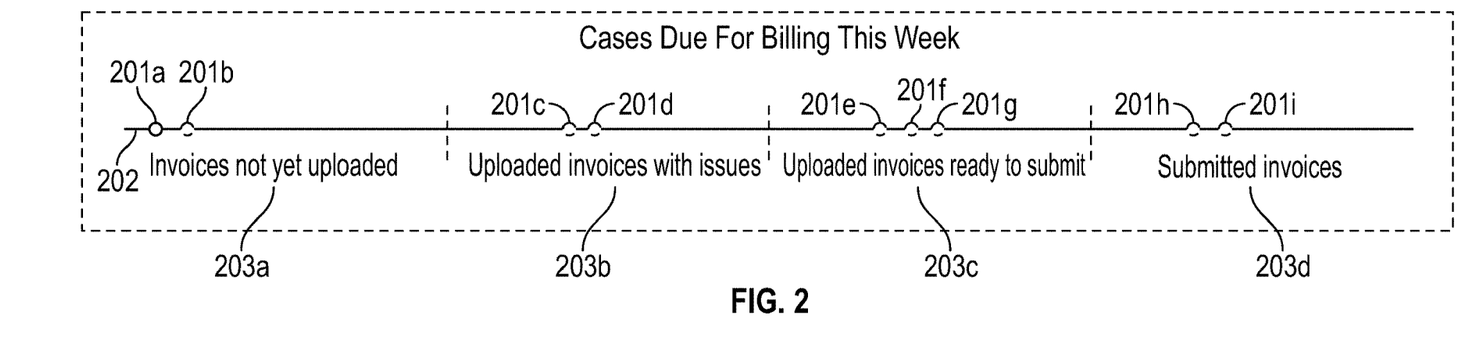
FIG. 2 is a first screenshot of an interactive animated user interface of a step-wise visual path on a portion of a display screen.

FIG. 2 shows an interactive animated user interface of a step-wise visual path on a portion of a display screen. The step-wise visual path can include a line 202 drawn on the screen. The line orientation 202 can be horizontal, vertical, or diagonal. The line pattern 202 can be solid, dotted, dashed, or implied. The line 202 can be straight, zig-zagged, or curved. The line color 202 can be black, red, green, or any other color.

The line could be divided into another number of sections without deviating from the present invention. The line may be divided into quadrants 203a-d. The first quadrant 203a may include a representation of the number of new invoices that are not yet uploaded. The second quadrant 203b may include a representation of the number of uploaded invoices that may not be able to process without human intervention. The third quadrant 203c may include a representation of the number of uploaded invoices that have been automatically processed by the software and are ready to submit electronically. The fourth quadrant 203d may include a representation of the number of invoices submitted electronically. The invoice may be electronically submitted to a payment processing software or an insurance carrier client. This invoice may be submitted by a law firm.

Each quadrant may include symbols 201a-i to represent the status of each invoice. The shape of the symbol 201a-i may be a circle, square, triangle, or any other symbol or shape. The line pattern on the symbol 201a-i can be solid, dotted, dashed, or implied. The symbol 201a-i can be hollow, shaded, or textured. The position of the symbol 201a-i may be on, above, or below the line. The color of the symbol 201a-i may be green, red, orange, yellow, black, or blue. In some embodiments, the symbols may be on multiple lines, for instance, if the line in a quadrant is filled, the symbols could continue on a second line. Or the symbols could be limited to a set number, perhaps to those who fit on the line. A second symbol could be used for a group of symbols, perhaps a large symbol to represent ten invoices. In still another embodiment, a number could be placed on the line to represent a group of invoices.

In FIG. 2, the symbols 201a and 201b may each represent a new invoice that was not yet uploaded. The invoice could be uploaded into an accounts payable package, a legal review package, or an accounts receivable package. The symbols 201c and 201d may each represent an uploaded invoice that may not be able to process without human intervention. The symbols 201e, 201f, and 201g may each represent an uploaded invoice that is ready to submit electronically. The symbols 201h and 201i may each represent an invoice that was submitted electronically.

Figure 3:
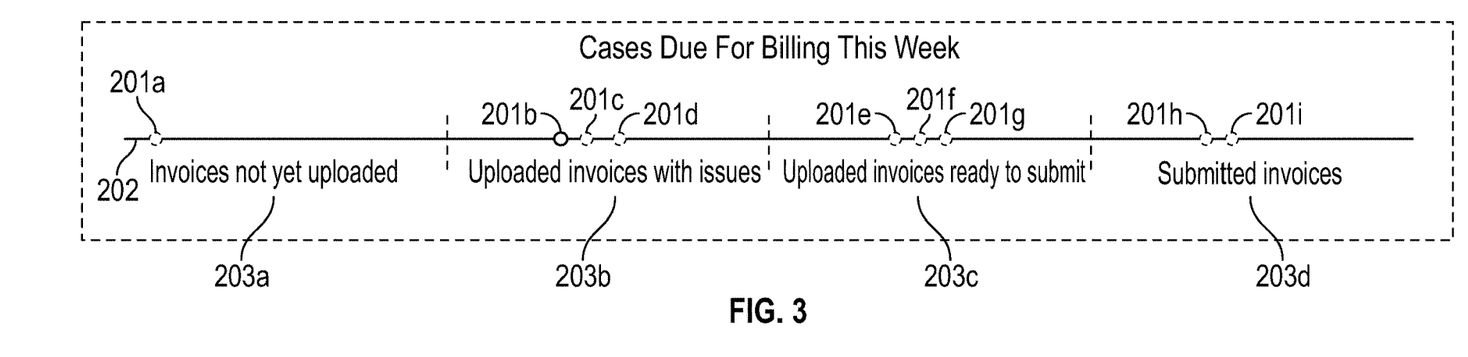
FIG. 3 is a second screenshot of an interactive animated user interface of a step-wise visual path on a portion of a display screen.

FIG. 3 shows the animation of symbol 201b from the first quadrant in FIG. 2 to the second quadrant in FIG. 3. In this animation, the new invoice that was not yet uploaded in FIG. 2 may have been uploaded by the user in FIG. 3. This invoice may not be able to process without human intervention.

Figure 4:
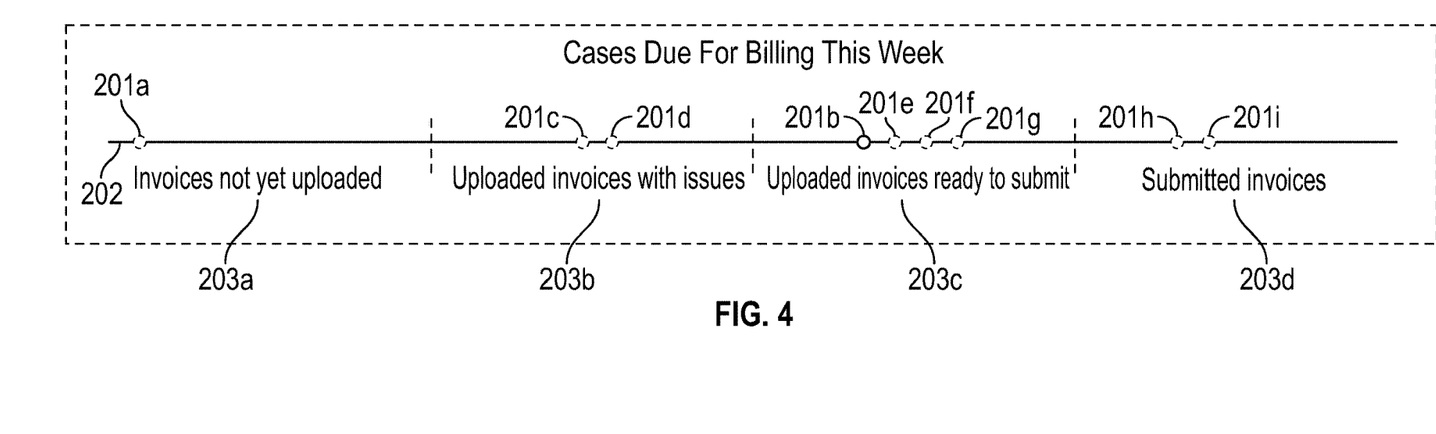
FIG. 4 is a third screenshot of an interactive animated user interface of a step-wise visual path on a portion of a display screen.

FIG. 4 shows the animation of symbol 201b from the second quadrant in FIG. 3 to the third quadrant in FIG. 3. In this animation, the invoice that was uploaded but is may not be able to process without human intervention in FIG. 3 may have been corrected by the user and is, therefore, ready to submit in FIG. 4.

Figure 5:
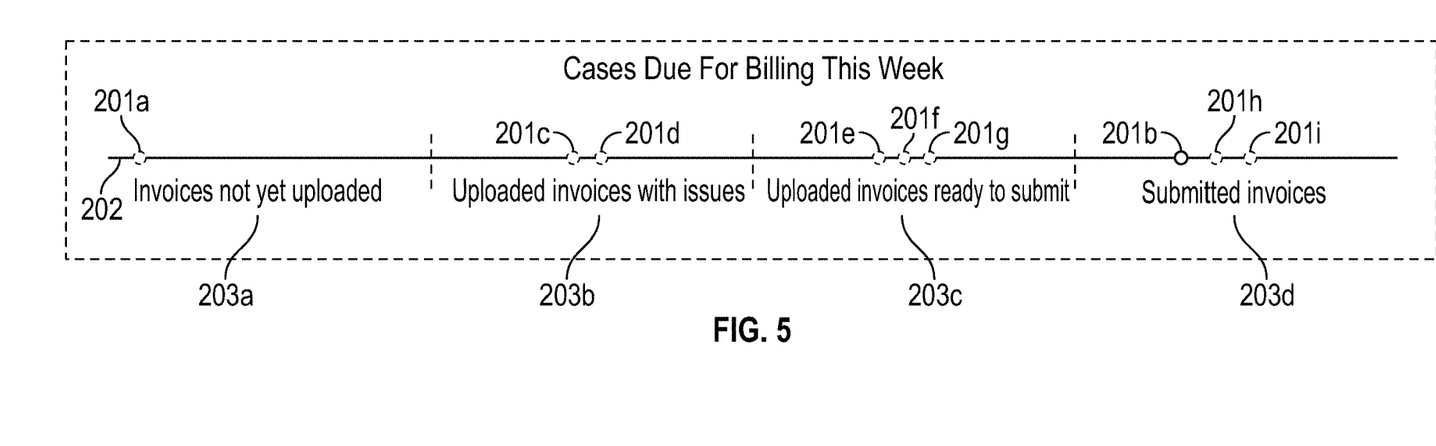
FIG. 5 is a fourth screenshot of an interactive animated user interface of a step-wise visual path on a portion of a display screen.

FIG. 5 shows the animation of symbol 201b from the third quadrant in FIG. 4 to the fourth quadrant in FIG. 5. In this animation, the invoice that was ready to submit in FIG. 4 may have been submitted by the user in FIG. 5.

Figure 6:
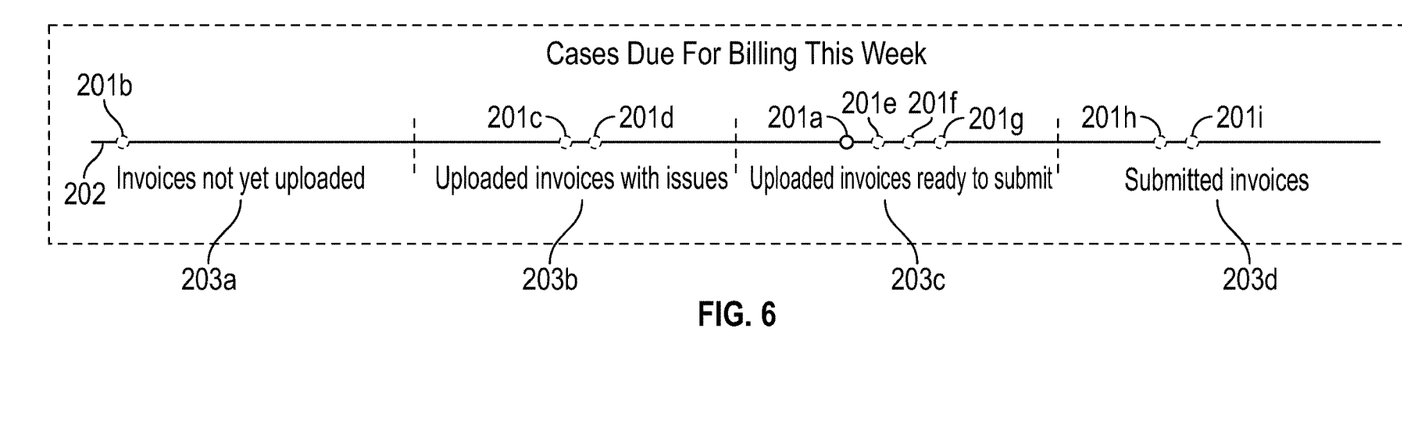
FIG. 6 is a fifth screenshot of an interactive animated user interface of a step-wise visual path on a portion of a display screen.

FIG. 6 shows the animation of symbol 201a from the first quadrant in FIG. 2 to the third quadrant in FIG. 6. In this animation, the new invoice that was not yet uploaded in FIG. 2 may have been uploaded by the user in FIG. 6. This invoice can be processed without human intervention.

Figure 7:
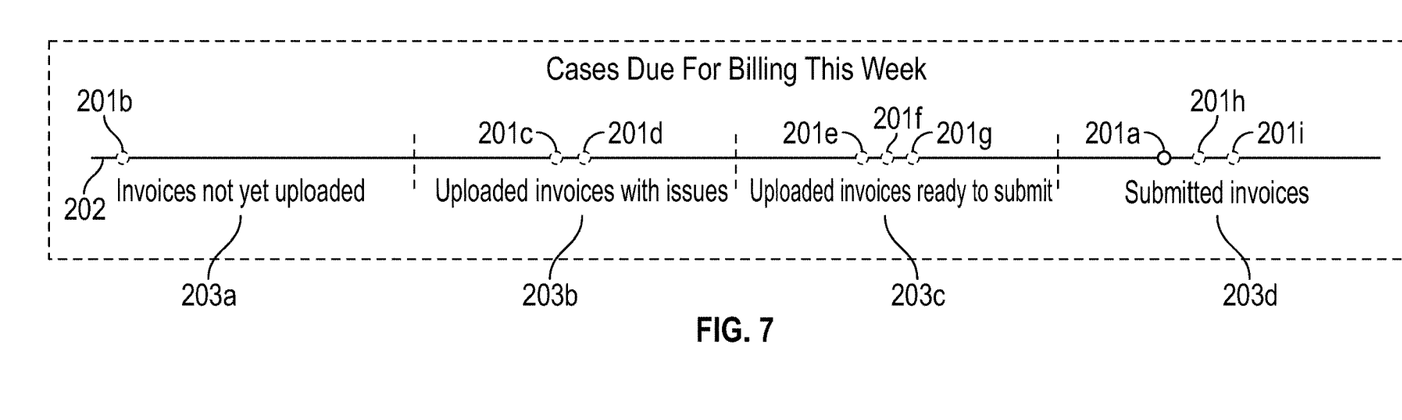
FIG. 7 is a sixth screen shot of an interactive animated user interface of a step-wise visual path on a portion of a display screen.

FIG. 7 shows the animation of symbol 201a from the third quadrant in FIG. 4 to the fourth quadrant in FIG. 7. In this animation, the invoice that was ready to submit in FIG. 4 may have been submitted by the user in FIG. 7.

Figure 8:
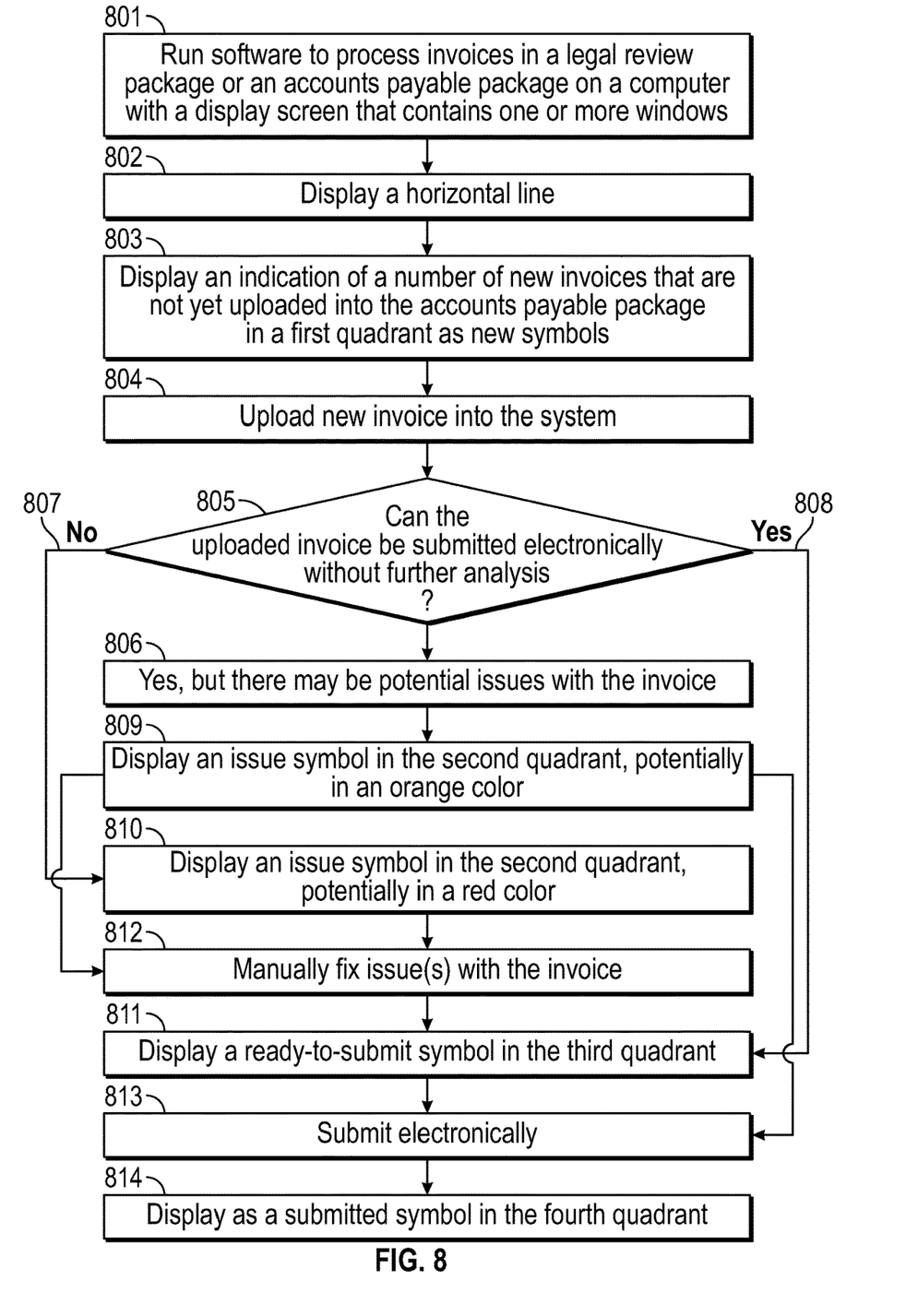
FIG. 8 is flow chart of the step-wise visual path.

FIG. 8 describes one embodiment to produce step-wise visual path of the status of an invoice for invoice management. First, the software is run to process invoices in an accounts payable package, a legal review package, or an accounts receivable package on a computer 101 with a display screen 105 that contains one or more windows 801. Second, a horizontal line 802 is displayed on the screen 105, which can be divided into quadrants 203a-d.

The software may search the database (on the storage 104) for invoices that are not yet uploaded. The software may display an indication of the number of new invoices that are not yet uploaded as new symbols 201a, 201b in the first quadrant 803. The software may upload the number of new invoices into the package 804.

The new symbol 201a-i of each invoice will move across the line into the second 203b or third quadrant 203c, depending on whether each invoice can be submitted electronically without human interaction 805. If an invoice can be submitted electronically without human interaction 808, then the new symbol for that invoice will move to the third quadrant 203c as a ready-to-submit symbol 811. If an invoice cannot be submitted electronically without further analysis by a second software algorithm or through human interaction 807, then the new symbol for that invoice will move to the second quadrant 203b as an issue symbol, potentially in a red color 810. If an invoice can be submitted electronically without additional analysis but there may be potential issues with the invoice 806, then the new symbol for that invoice will move to the second quadrant 203b as an issue symbol, potentially in an orange color 809.

If an invoice can be submitted electronically without additional analysis 808, then the software can submit the invoice electronically 811. The ready-to-submit symbol would move to the fourth quadrant 203d as a submitted symbol 814.

If an invoice cannot be submitted electronically without additional analysis 807, then the software may manually fix the invoice 812. The issue symbol for that invoice will then move third quadrant 203c as a ready-to-submit symbol 811. The software can then submit the invoice electronically 811. The ready-to-submit symbol would move to the fourth quadrant 203d as a submitted symbol 814.

If an invoice can be submitted electronically without additional analysis but there may be potential issues with the invoice 806, then the software may either manually fix the invoice 812 or submit the invoice electronically 811. If the software fixes the invoice, the issue symbol for that invoice will then move third quadrant 203c as a ready-to-submit symbol 811. The software can then submit the invoice electronically 811. The ready-to-submit symbol would move to the fourth quadrant 203d as a submitted symbol 814. If the software submits the invoice electronically 811, then the ready-to-submit symbol would move to the fourth quadrant 203d as a submitted symbol 814.

In another view of FIG. 8, an accounts payable software package executes on the server 103 (although it could run on the computer 101). The accounts payable software receives invoices from a scanner, an email over the internet 102, a file that arrives over the internet 102, or is copied from a CD ROM, a disk, a USB drive, a wireless network, or is keyed in by a user. This invoice is stored in a database on the storage devices 104. The accounts payable software may have a status display module. The status display module displays 802 a line 202 on the screen 105. The status display module places 803a symbol 201a, 201b in the first section of the line, perhaps in the first quadrant 203a. The accounts payable software then uploads the invoices 804.

In some embodiments, the uploading includes pulling the invoice from the database, converting the invoice image to a machine-readable form (perhaps through optical character recognition software, or perhaps through invoice analysis software such as described in U.S. patent application Ser. No. 16/600,613, "by Partial Perception Image Hashing for Invoice Deconstruction," filed by Mitchell Ransom and Shane O'Hara on Oct. 14, 2019, incorporated herein in its entirety by reference. Or as described in U.S. Pat. No. 10,732,789, "Machine learning visualization", issued to William Cashman, Michael Marcinelli, Flora Kidani, Anne Baron, Jonathan Hewitt, and John Canneto on Aug. 4, 2020, incorporated herein in its entirety by reference.) Once the invoice is converted to machine-readable form, the information from the invoice is loaded into the accounts payable software. The status display module may then remove the symbol 201a, 201b from the display in the first quadrant 203a.

The accounts payable software evaluates the invoice information 805: Is it complete? Did an error occur in the conversion? Does some of the information conflict with existing information in the accounts payable software (different address, etc.)? If no issue is found 808, then the symbol 201e, 201f, 201g representing the invoice is displayed 811 in the third quadrant 203c.

If the evaluation shows an issue 806, 807, the symbol 201c, 201d is displayed 809,810 in the second quadrant 203b. The accounts payable software will then pass the invoice information over to more advanced software to resolve the issues found 812. In other situations, the invoice information is provided to a person to review. See U.S. Pat. No. 10,732,789 for more information on how this information could be displayed for the person to review. See also U.S. Pat. No. 11,042,555, "Two-step algorithm for non-exact matching of large datasets" issued to Mark G. Kane, Richard J. Diekema, Jr., and Kaiyu Pan on Jun. 22, 2021 for more information on matching non-exacting text, incorporated herein in its entirety by reference. Once the issues found in the invoice are resolved, the information from the invoice is corrected in the accounts payable software. The status display module may then remove the symbol 201c, 201d from the display in the second quadrant 203b. A symbol 201e, 201f, 201g representing the invoice is displayed in the third quadrant 203c for each corrected (or correct) invoice.

The invoices are then moved through the accounts payable software to prepare them for payment. When the invoice is ready to be paid, the invoice is submitted 813. The symbol 201e, 201f, 201g representing the invoice is removed from the display in the third quadrant 203c, and a symbol 201h, 201i is displayed 814 in the fourth quadrant 203d.

Once the invoice is paid, the symbol 201h, 201i is removed from the display in the fourth quadrant 203d.

The foregoing devices and operations, including their implementation, will be familiar to, and understood by, those having ordinary skill in the art. This user interface serves to overcome the problem of recognizing the status of invoices during invoice management.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

What is claimed is:

1. A non-transitory machine-readable media programmed to:
   store a new invoice in a list in a database;
   count a number of new invoices in the list in the database;
   display in a graphical user interface on a computer screen the number of symbols representing new invoices that are not yet uploaded into an accounts payable package in a first quadrant of a line in one or more windows, wherein there is a new symbol on the line that runs through the first quadrant for each invoice that is not uploaded;
   process the invoice from the database in the accounts payable package on a computer with a display screen that contains the one or more windows;
   count a number of uploaded invoices needing further analysis in the database;
   display in the graphical user interface on the computer screen the number of symbols representing uploaded invoices that the accounts payable package cannot process without the further analysis in a second quadrant of the line in the one or more windows, wherein there is an issue symbol on the line that runs through the second quadrant for each uploaded invoice with issues;
   count a number of uploaded invoices that do not need the further analysis in the database;
   display in the graphical user interface on the computer screen the number of symbols representing uploaded invoices that do not need the further analysis in a third quadrant of the line in the one or more windows, wherein there is a ready-to-submit symbol on the line that runs through the third quadrant for each uploaded invoice that is ready to submit;
   count a number of invoices submitted electronically to a payment processing software in the database; and
   display in the graphical user interface on the computer screen the number of symbols representing invoices submitted electronically to the payment processing software in a fourth quadrant of the line in the one or more windows, wherein there is a submitted symbol on the line that runs through the fourth quadrant for each submitted invoice.

2. The non-transitory machine-readable media according to claim 1 wherein the new symbol on the line is a circle.

3. The non-transitory machine-readable media according to claim 1 wherein the submitted symbol on the line is a triangle.

4. The non-transitory machine-readable media according to claim 1 wherein the issue symbol on the line is a square.

5. The non-transitory machine-readable media according to claim 1 wherein the issue symbol is identical in shape to the submitted symbol.

6. The non-transitory machine-readable media according to claim 1 wherein the issue symbol on the line that runs through the second quadrant is red.

7. The non-transitory machine-readable media according to claim 1 wherein the issue symbol on the line that runs through the second quadrant is orange.

8. A computer-implemented method for visualizing invoice management through an animated graphical user interface from one or more processing units, the computer-implemented method comprising:
  storing an invoice in a database;
  counting a number of new invoices in the database;
  displaying in the animated graphical user interface on a computer screen the number of symbols representing new invoices that are not yet uploaded into an accounts payable package in a first quadrant of a line in one or more windows, wherein there is a new symbol on the line that runs through the first quadrant for each invoice that is not uploaded;
  processing the invoice from the database in the accounts payable package on a computer with a display screen that contains the one or more windows;
  counting a number of uploaded invoices needing further analysis in the database;
  displaying in the animated graphical user interface on the computer screen the number of symbols representing uploaded invoices that the accounts payable package cannot process without the further analysis in a second quadrant of the line in the one or more windows, wherein there is an issue symbol on the line that runs through the second quadrant for each uploaded invoice with issues;
  counting a number of uploaded invoices that do not need the further analysis in the database;
  displaying in the animated graphical user interface on the computer screen the number of symbols representing uploaded invoices that do not need the further analysis in a third quadrant of the line in the one or more windows, wherein there is a ready-to-submit symbol on the line that runs through the third quadrant for each uploaded invoice that is ready to submit;
  counting a number of invoices submitted electronically to a payment processing software in the database; and
  displaying in the animated graphical user interface on the computer screen the number of symbols representing invoices submitted electronically to the payment processing software in a fourth quadrant of the line in the one or more windows, wherein there is a submitted symbol on the line that runs through the fourth quadrant for each submitted invoice.

9. The computer-implemented method according to claim 8, the computer-implemented method comprising:
  determining that an uploaded invoice cannot be submitted without the further analysis; and
  moving the new symbol on the line that runs through the first quadrant into the second quadrant as the issue symbol in a red color.

10. The computer-implemented method according to claim 8, the computer-implemented method comprising:
  determining that an uploaded invoice can be submitted without the further analysis; and
  moving the new symbol on the line that runs through the first quadrant into the second quadrant as the issue symbol in an orange color.

11. The computer-implemented method according to claim 8, the computer-implemented method comprising:
  uploading the invoice into the accounts payable package;
  determining that the invoice can be submitted electronically to the payment processing software without the further analysis; and
  moving the new symbol on the line that runs through the first quadrant into the third quadrant as the ready-to-submit symbol.

12. The computer-implemented method according to claim 11, the computer-implemented method comprising:
  submitting the invoice electronically to the payment processing software; and
  moving the ready-to-submit symbol on the line that runs through the third quadrant into the fourth quadrant as the submitted symbol.

13. An apparatus for visualizing invoice management, the apparatus comprising:
  a display screen;
  a computer electrically connected to the display screen; and
  an interactive animated user interface on the display screen, wherein the interactive animated user interface operates on the computer and displays a step-wise visual path of symbols across a line on the display screen; wherein the display of the step-wise visual path of the symbols includes one or more new symbols on the line that runs through a first quadrant for each invoice that is not uploaded; wherein the display of the step-wise visual path of the symbols includes one or more issue symbols on the line that runs through a second quadrant for each uploaded invoice with issues; wherein the display of the step-wise visual path of the symbols includes one or more ready-to-submit symbols on the line that runs through a third quadrant for each uploaded invoice that is ready to submit; wherein the display of the step-wise visual path of the symbols includes one or more submitted symbols on the line that runs through a fourth quadrant for each submitted invoice.

14. The apparatus according to claim 13, wherein:
the interactive animated user interface determines if an uploaded invoice cannot be submitted without further analysis and moves the new symbol on the line that runs through the first quadrant into the second quadrant as the issue symbol in a red color.

15. The apparatus according to claim 13, wherein:
the interactive animated user interface determines if an uploaded invoice can be submitted without further analysis and moves the new symbol on the line that runs through the first quadrant into the second quadrant as the issue symbol in an orange color.

16. The apparatus according to claim 13, wherein:
the interactive animated user interface uploads the invoice into an accounts payable package, determines that the invoice can be submitted electronically to a payment processing software without further analysis, and moves the new symbol on the line that runs through the first quadrant into the third quadrant as the ready-to-submit symbol.

17. The apparatus according to claim 13, wherein:
the interactive animated user interface submits the invoice electronically to a payment processing software and moves the ready-to-submit symbol on the line that runs through the third quadrant into the fourth quadrant as the submitted symbol.

* * * * *